US007810618B2

(12) United States Patent
Weber et al.

(10) Patent No.: US 7,810,618 B2
(45) Date of Patent: Oct. 12, 2010

(54) VIBRATION GENERATOR

(75) Inventors: Hans-Jürgen Weber, Wenden-Heid (DE); Carl Hagemeyer, Olpe (DE)

(73) Assignee: Klemm Bohrtechnik, Drolshagen (DE)

( * ) Notice: Subject to any disclaimer, the term of this patent is extended or adjusted under 35 U.S.C. 154(b) by 1142 days.

(21) Appl. No.: 11/420,041

(22) Filed: May 24, 2006

(65) Prior Publication Data

US 2006/0266028 A1 Nov. 30, 2006

(30) Foreign Application Priority Data

May 30, 2005 (EP) .................................. 05011642

(51) Int. Cl.
*F16F 9/00* (2006.01)

(52) U.S. Cl. .......................... 188/316; 366/124; 92/163

(58) Field of Classification Search ................. 188/316, 188/317; 366/124, 125; 92/163, 164, 169.1; 91/224, 225, 235
See application file for complete search history.

(56) References Cited

U.S. PATENT DOCUMENTS 4,026,193 A 5/1977 Olmsted
4,031,812 A 6/1977 Koshelev
5,095,809 A * 3/1992 Kroger ........................ 92/163

FOREIGN PATENT DOCUMENTS

| | | | |
|---|---|---|---|
| CA | 920158 | | 3/1963 |
| DE | 3838639 | A1 | 5/1990 |
| WO | 2004009298 | A1 | 1/2004 |

OTHER PUBLICATIONS

European Search Report, Application No. EP 05 01 1642, Dated Jan. 26, 2006.

* cited by examiner

*Primary Examiner*—Pam Rodriguez
(74) *Attorney, Agent, or Firm*—John A. Merecki; Hoffman Warnick LLC

(57) ABSTRACT

The invention relates to a vibration generator comprising a working piston and to a construction apparatus having a vibration generator, wherein the vibration generator is operated by a pressure fluid and comprises a control device having a control piston, which is supported in a displaceable manner inside the working piston.

10 Claims, 4 Drawing Sheets

VIBRATION GENERATOR

FIELD OF THE INVENTION

The invention relates to a vibration generator according to the preamble of claim 1 comprising a working piston and a control device having a control piston, which is supported in a displaceable manner inside the working piston, and a construction apparatus having a vibration generator according to the preamble of claim 10.

BACKGROUND OF THE INVENTION

Vibration generators of such kind can be employed in a variety of applications, for instance in such applications where loose goods are to be compacted, e.g. in the packaging industry or in the production and compaction of cast pieces made of concrete or similar material. Likewise, there is a wide range of applications given in foundation construction engineering for producing boreholes in the soil or for soil compaction.

In devices employed for soil compaction two rotating unbalanced mass elements are arranged alongside each other. One unbalanced mass element is connected to a drive unit, while the second one is driven by a gear. The phase position of the unbalanced masses on the respective unbalanced shafts can be adjusted so that a feed motion of a vibrating plate is infinitely adjustable.

DE 195 23 030 C2 discloses a vibrator having a housing, in which a movably supported excitant for generating vibrations and a drive for the excitant consisting of a piston-cylinder unit are arranged. The excitant is rigidly coupled with a hydraulically driven drive piston of the piston-cylinder unit and is reciprocable in a linear fashion with respect to the action of spring and damping means that are variably adjustable in their spring characteristic.

There are also vibrators known that are operated by a pressure medium.

DT 24 45 215 A1 describes a vibrator comprising a piston seated in a displaceable manner in a cylinder, which has an inlet port and two outlet ports located in the wall of the cylinder. The cylinder or the piston are sleeved, and the sleeve forms cooling ducts for the passage of driving medium.

DE 39 15 773 A1 discloses a piston vibrator consisting of a case having a cylindrical bore, an air connection guided laterally to the bore and a piston that is longitudinally displaceable in the bore. At the axial level of the air connection the cylindrical bore extends asymmetrically to the external wall area of the case.

From DE 17 68 865 U1 a vibration generator is known, in which a drive piston is reciprocated mechanically at a constant amplitude in a housing. By means of an air column the drive piston, functioning as excitant, transmits a vibrating movement to a working piston that is freely movable in the same cylindrical housing and is coupled through an air column with the drive piston. On the side of the working piston lying opposite the air column a further air column is provided, with the volume of the two air columns being adjustable so that the vibrations of the working piston and its amplitude can be adjusted infinitely by means of the air volume of the air columns.

However, with air and other compressible media it is very often not possible to achieve sufficiently high power levels. For this reason it is necessary to render vibration generators more efficient whilst having the same external dimensions or to make them more compact whilst retaining the same power. This can be achieved e.g. by using incompressible media as working fluid. However, in such cases very high demands are often made on the complexity of the construction.

SUMMARY OF THE INVENTION

The invention is based on the object to provide a vibration generator, which, whilst being of a simple construction, can also be driven in a reliable manner by means of incompressible media.

This object is solved by a vibration generator in accordance with claim 1. Advantageous embodiments of the invention are set out in the dependent claims.

As a result of the features according to the invention a vibration generator is provided that can be operated by means of an incompressible medium, whereby the vibration generator is able to transmit a considerably higher power with the same constructional size in comparison to pneumatic systems. On account of the simple mechanical construction of the control device a failure-free, reliable operation is ensured.

Therefore, maintenance works that involve a great amount of time and considerable costs, as frequently occur in complex electronic control systems, can be dispensed with. Likewise, the production of the vibration generator according to the invention can be carried out in a cost-effective way, because only mechanical elements are employed.

In addition, the transmission of the vibration is exclusively effected by the oscillating movement of the housing. Hence, there is no direct contact between the working piston and the wall of the housing. Such impact movements lead to high noise emissions, increase wear and shorten the working life of the apparatus.

Therefore, a vibration generator is provided by the invention which produces little noise pollution during operation and whose individual constructional elements possess a relatively long working life.

Use can be made of all kinds of conventional gases and liquids as pressure fluids. An especially high efficiency is attained in particular with incompressible liquids, such as hydraulic oil.

The surface ratios of working piston and control piston are chosen such that the accelerative forces are equally high on the effective mass in both directions of movement.

For ease of production a housing of cylindrical design suggests itself. As a result, production costs can be kept at a low level and due to the more uniform force distribution wear processes can be minimized.

For this purpose it is useful to support the working piston in its entirety in the cylindrical housing and not direct it out of the housing. As a result, sealings prone to wear can be avoided.

By preference, the working piston is supported concentrically in the cylindrical housing. This permits an easy production for a uniform mechanical loading capacity during operation.

It is of advantage if the control piston can be displaced between two control piston reversal points that are predetermined by two stop portions on the housing. These stop portions can also be designed in a protruding manner and made of a particularly impact-resistant material. The displacement between two reversal points only permits simple mechanical movements and ensures a reliable control. At its ends the housing can also be sealed by covers. In such case the stop portions can be formed through a design on the inner side of the cover which influence the end position of the control piston.

By preference, the stop portions are adjustable. By means of the adjustable stop portions the length of travel covered by the control piston and consequently the time interval per stroke cycle of the control piston can be varied. Thus, the oscillating frequency of vibration can be adjusted easily to match the respective application. What is also conceivable in this case is an adjustment during running operation so that there is no need for the work process to be interrupted. The adjustable stop portions can be designed in the form of adjusting screws or adjusting stops which can be externally adjusted either mechanically or hydraulically.

In a further embodiment of the vibration generator according to the invention the working piston can be displaced between two working piston reversal points and the control piston is designed such that it reaches its control piston reversal point a defined period of time before the working piston reaches its working piston reversal point on the respective side. In this way it can be ensured that the working piston does not abut against the housing and therefore disturbing noises are avoided on the one hand and mechanical wear is reduced on the other hand.

This can preferably be achieved in that the stroke length of the control piston is the same length as that of the working piston. A reduction of the stroke length of the control piston can be implemented both by a greater expansion of the control piston relative to the working piston and by stop portions protruding from the inner wall of the housing.

The housing suitably includes a fluid supply for supplying a pressure fluid and a fluid return for discharging a pressure fluid. These fluid supplies and returns can be designed for example as boreholes in the wall of the housing. Owing to the separate arrangement of fluid supply/return the pressure fluid can be supplied or discharged in a defined and easily controllable manner to the portions provided for this purpose.

It is of advantage if, in addition to a main supply line that connects the fluid supply with a supply control chamber, two supply distributing lines are also provided in the working piston that connect the supply control chamber with the first pressure chamber on the one hand and with the second pressure chamber on the other hand. The main supply line and the two supply distributing lines can be designed as boreholes inside the working piston. The supply control chamber can be formed by the end portions of the main supply line with the distributing lines. Thus, it is possible in a simple way to supply the two pressure chambers with a pressure fluid in particular in an alternating manner and separate from each other and to ensure hydraulic independence of the two pressure chambers. In order to attain an optimum supply of the pressure fluid to the main supply line a radially surrounding recess for receiving the pressure fluid can be provided in the external portion of the working piston.

Furthermore, it is preferred if, in addition to a main return line that connects the fluid return with a return control chamber, two return distributing lines are also provided in the working piston that connect the return control chamber with the first pressure chamber on the one hand and with the second pressure chamber on the other hand.

In analogy to the supply system the main return line and the two return distributing lines can be designed as boreholes inside the working piston. In this way the return control chamber can be formed by end portions of the main return line with the two distributing lines. Thus, it is rendered possible in a simple way to supply the two pressure chambers with a pressure fluid in particular in an alternating manner and separate from each other and to ensure hydraulic independence of the two pressure chambers.

For an optimum discharge of the pressure fluid into the main return line a radially surrounding recess for receiving the pressure fluid can be provided in the external portion of the working piston, the recess serving at the same time to receive the fluid from the supply.

In a particularly preferred embodiment of the device according to the invention the control piston includes control portions, through which the pressure fluid can be directed from the supply control chamber to either one or the other supply distributing line. By means of the control portions it is possible through a simple displacement of the control piston relative to the working piston to direct the pressure fluid in a defined manner into one of the two pressure chambers or to block the supply of fluid.

By analogy, the control piston has further control portions, through which the pressure fluid can be directed from one of the two pressure chambers via one of the two return distributing lines into the return control chamber. Due to the mechanical displacement of the control piston a defined discharge of the pressure fluid from one of the two pressure chambers into the return line is rendered possible. For a simple production it is advantageous for the control portions to be designed as control edges.

It is suitable for the control piston to be supported centrally in the working piston. As a result of this support optimum force distribution is guaranteed allowing for a greater efficiency. Moreover, in such kind of support, wear processes can be reduced and the working life of the device can be prolonged thereby. Hence, cost-intensive repair and maintenance intervals can be dispensed with. What is more, a central support is easy to realize from a production engineering point of view so that production costs can be downsized.

It is of advantage if the control piston is of a greater length than the working piston. Through this the time intervals per stroke of the control piston are shorter than those of the working piston. Thus, the control piston reaches its reversal point earlier than the working piston, for which reason it can bring about the reversal of the flow direction of the pressure fluid already when the working piston has not yet reached the inner wall of the housing. An abutment of the working piston against the housing wall is therefore prevented and disturbing impact noises and wear effects can be avoided in this way. Of course, it is also possible to shorten the intervals of travel of the control piston with respect to the working piston by means of stop portions that protrude from the inner wall of the housing and are only able to come into contact with the control piston.

The vibration generator in accordance with the invention is provided in a construction apparatus according to claim 10.

The construction apparatus concerned here can be constituted in particular by a drilling apparatus or a vibrating ram for introducing piles, planks etc. into the soil.

When making boreholes the drilling progress can be improved if the drilling operation is assisted by an oscillating movement of the drilling tool. As a result, the time required for making the borehole can be reduced appreciably and the economic efficiency can be increased. Particularly with regard to the continuously rising cost pressure, that also makes itself felt in the field of the construction industry, the competitiveness of the company is improved in this way. When using a construction apparatus based on the vibration generator according to the invention that distinguishes itself by non-abutting working elements the operating staff and the environment are subjected to less stress due to a lower production in noise. Especially in the construction industry the stress of the material caused by heavy mechanical forces, hard soil material and humid weather conditions is extremely high so that the reduced wear of the construction apparatus according to the invention has a positive effect on the application time and accounts for a reduction of operational costs.

Since the apparatus in accordance with the invention is able to operate on the basis of a hydraulic system with incompressible fluid, the power sought to be achieved is higher in comparison to pneumatic systems based on compressible fluids. Therefore, the vibration generator according to the invention can be employed in an advantageous manner in a vibrating ram or in other devices used for working the soil.

BRIEF DESCRIPTION OF THE DRAWINGS

In the following the invention will be described further by way of an embodiment schematically shown in the drawings, wherein.

DETAILED DESCRIPTION OF THE INVENTION

Figure 1:
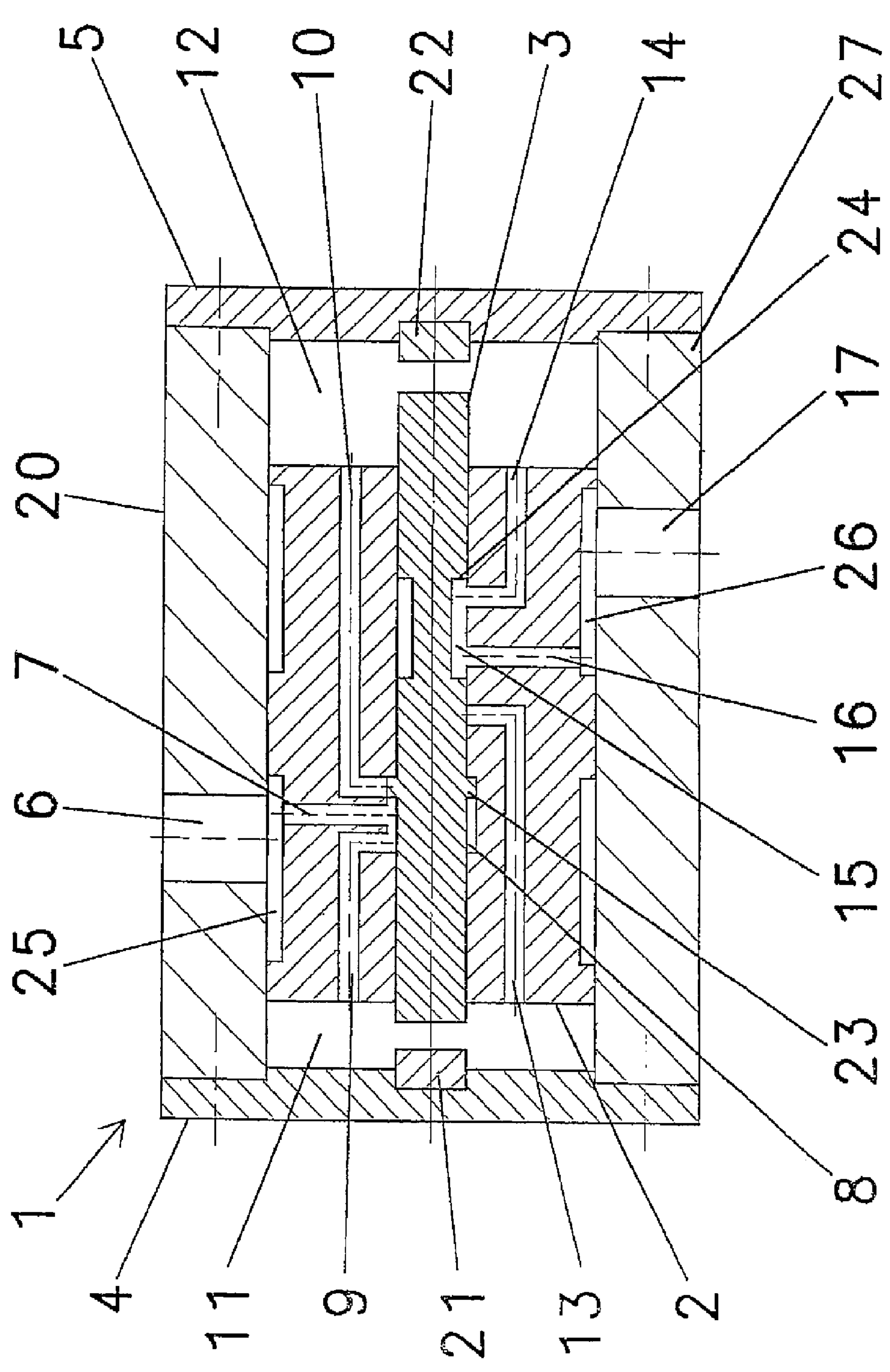
FIG. 1 shows a cross-sectional view of the vibration generator according to the invention.

As shown in FIG. 1, the vibration generator 1 comprises a housing 20, a working piston 2 supported concentrically and displaceable in a linear manner in the said housing and a control piston 3 arranged concentrically and displaceable in a linear manner in the working piston 2.

The housing 20 comprises a housing shell 27 that has boreholes for the fluid supply 6 and the fluid return 17 as well as a left cover 4 and a right cover 5. The covers are provided with a first stop portion 21 and a second stop portion 22 that define end portions of the control piston 3.

Together with the housing 20 the working piston 2 forms a first and a second pressure chamber 11, 12. On the outer wall of the cylindrically shaped working piston radially surrounding recesses 25, 26 are provided for directing the pressure fluid out of the fluid supply 6 or into the fluid return 17. Inside the working piston 2 a line system is located that consists of two mutually independent duct arrangements. One duct arrangement serves for the supply of the pressure fluid into one of the two pressure chambers 11, 12 and comprises a main supply line 7 as well as a first and a second supply distributing line 9, 10. The main supply line 7 merges into the supply reception 25 for receiving the pressure fluid from the fluid supply 6. The first supply distributing line 9 merges into the first pressure chamber 11, while the second supply distributing line 10 merges into the second pressure chamber 12. Together with the wall of the control piston 3 the outlets of the two supply distributing lines 9, 10 form with the main supply line 7 the supply control chamber 8. The second line system serves for the discharge of the pressure fluid from the pressure chambers 11, 12 and comprises a main return line 16 and two return distributing lines 13, 14. The first return distributing line 13 merges into the first pressure chamber 11, while the second return distributing line 14 merges into the second pressure chamber 12. The main return line 16 is connected via the return reception 26 with the fluid return 17 for the outflow of the pressure fluid.

The control piston 3 includes a first control portion 23 and a second control portion 24 which are designed as control edges. Through a displacement of the control piston the first control portion 23 opens or closes the main supply line and the supply distributing lines 9, 10, whereas the second control portion 24 connects through displacement the main return line 16 with one of the two return distributing lines 13, 14.

In the following the sequence of the individual stages of a vibration cycle will be set out.

Figure 2:
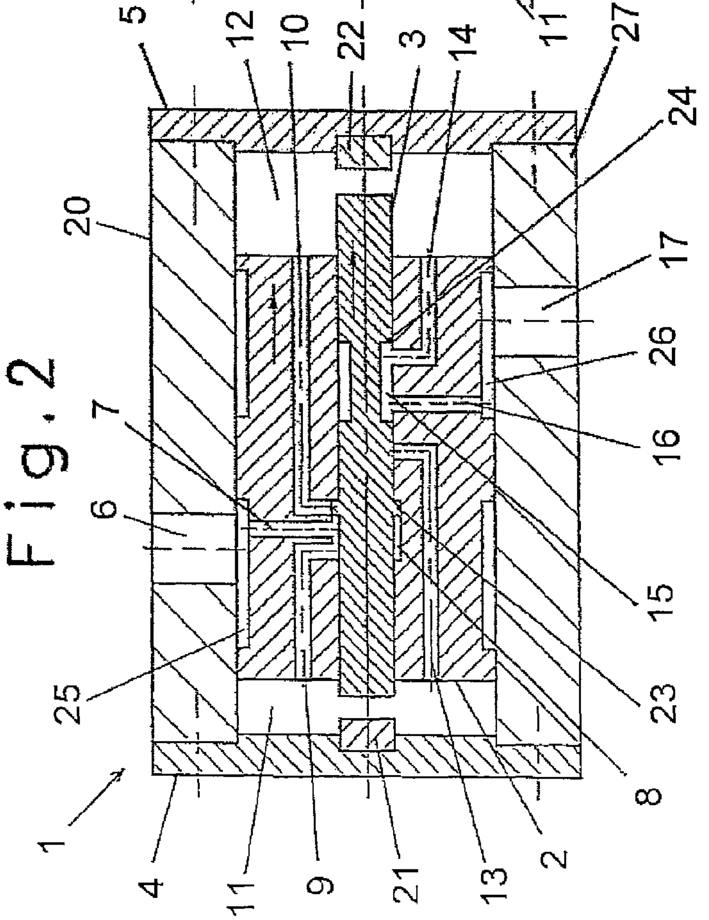

As shown in FIG. 2, the pressure fluid flows via the fluid supply 6 and the main supply line 7 into the supply control chamber 8 so that, due to the pressure building up in the supply control chamber 8, the control piston 3 is pressed to the right side inside the working piston 2 and abuts against the right side in the supply control chamber 8. The pressure of the pressure fluid continues to build up via the first supply distributing line 9 in the first pressure chamber 11 and presses the working piston 2 to the right side. At the same time the pressure fluid located in the second pressure chamber 12 flows via the second return distributing line 14 into the return control chamber 15 and from there via the main return line into the fluid return 17.

Figure 3:
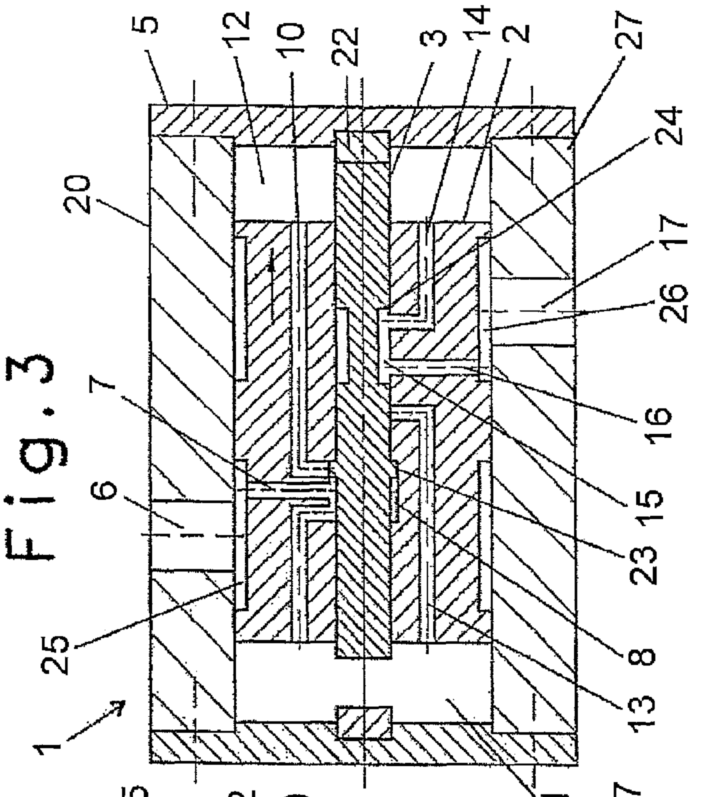
FIGS. 2 to 7 show cross-sectional views of the vibration generator according to the invention depicted in individual steps of a vibration cycle.

In FIG. 3 the working piston 2 moves to the right side so that the control piston 3 abuts against the second stop portion 22 located on the right cover 5.

Figure 4:
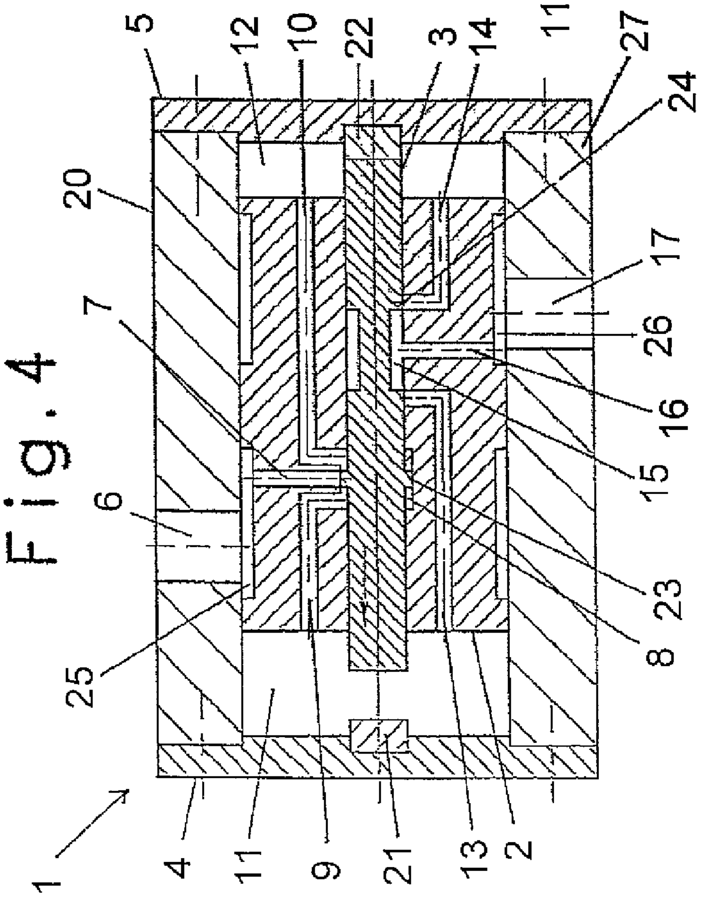

In FIG. 4 the control piston 3 remains in its position while the working piston 2, on account of its pressurization, moves up to the central position and from there further on to the right side due to its inertia. As a consequence, the relative position of the control piston 3 to the working piston 2 is changed. In relation to the working piston 2 the control piston 3 reaches the central position, in which neither the first pressure chamber 11 is in connection with the fluid supply 6 nor is the second pressure chamber 12 in connection with the fluid return 17. In this position the working piston is moved a bit further to the right side due to its mass inertia, whereby the pressurization of the control piston is changed. The control piston is displaced to the left side again, as a result of which the pressure conditions present on the working piston change and the movement direction of the working piston is reversed.

Figure 5:
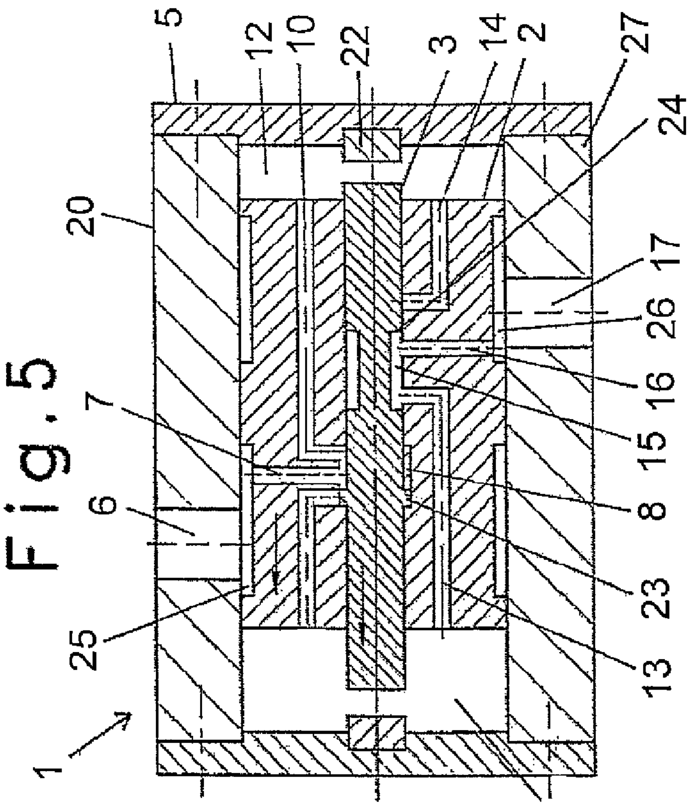

As shown in FIG. 5, through the movement of the working piston 2 to the right side the pressure fluid flows into the right portion of the supply control chamber 8 so that, due to the pressure building up in the supply control chamber 8, the control piston 3 is pressed to the left side inside the working piston 2 and abuts against the left side in the supply control chamber 8. Via the second supply distributing line 10 the pressure of the pressure fluid in the second pressure chamber 12 builds up and presses the working piston 2 to the left side. At the same time the pressure fluid located in the first pressure chamber 11 flows via the first return distributing line 13 into the return control chamber 15 and from there via the main return line 16 into the fluid return 17.

Figure 6:
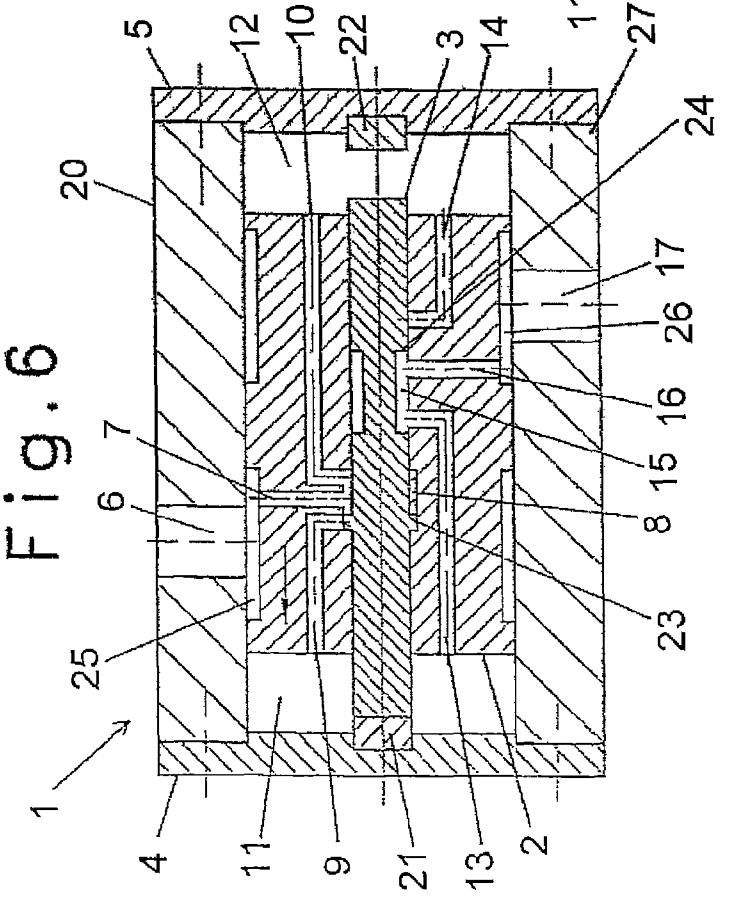

In FIG. 6 the working piston moves to the left side so that the control piston 3 abuts against the first stop portion 21 located on the left cover 4.

Figure 7:
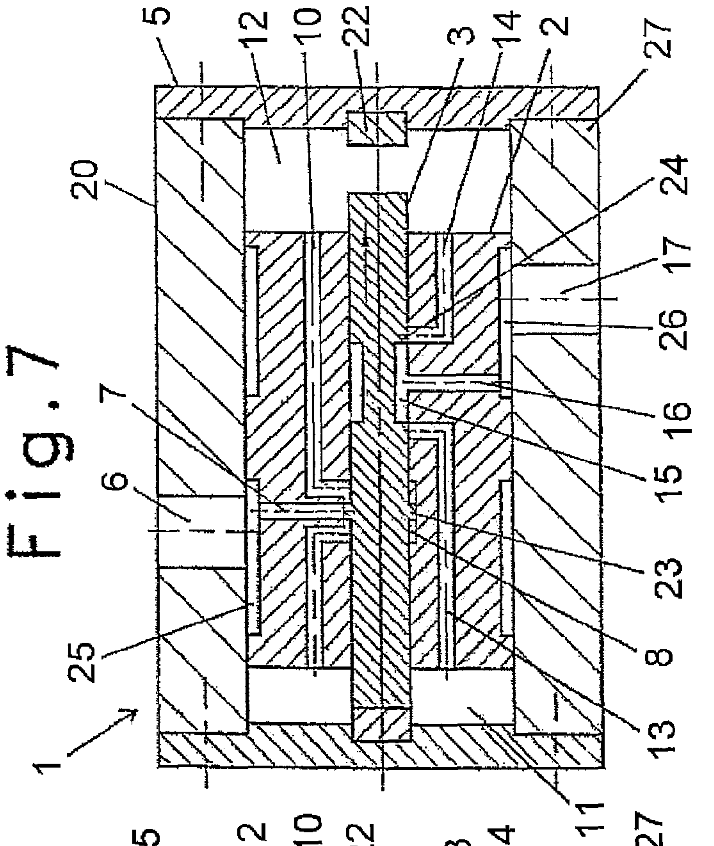

As shown in FIG. 7, the working piston 2 is pressed further to the left side, while the control piston 3 remains in its position. As a result, the position of the control piston 3 relative to the working piston 2 is changed. In relation to the working piston 2 the control piston 3 reaches the central position again, in which neither the second pressure chamber 12 is in connection with the fluid supply 6 nor is the first pressure chamber 11 in connection with the fluid return. In this position a change of direction is initiated again. Hence, the cycle has been completed once and is continued as described in FIG. 2.

The working piston 2 can be designed with a defined high mass, whereas the control piston 3 is of a considerably smaller design and has a substantially smaller mass, for instance by using a light metal.

The invention claimed is:

1. Vibration generator comprising a working piston which is supported in a reciprocating manner in a housing between first and second pressure chambers, wherein, depending on a position of the working piston, a pressure fluid can be directed alternately into the first or second pressure chambers by a control device and the working piston can be put into a reversing movement for generating vibrations, wherein the control device comprises a control piston which is supported in a displaceable manner inside the working piston, wherein the working piston comprises:

a main return line for connecting a return control chamber with a fluid return; and two return distributing lines for alternately connecting the return control chamber with the first or second pressure chambers to respectively discharge the pressure fluid from the first and second chambers out of the housing through the main return line and the fluid return.

2. Vibration generator according to claim 1, wherein the control piston can be displaced between two control piston reversal points which are predetermined by two stop portions located on the housing.

3. Vibration generator according to claim 2, wherein the stop portions are adjustable.

4. Vibration generator according to claim 1, wherein the working piston can be displaced between two working piston reversal points and the control piston reaches a control piston reversal point a defined period of time before the working piston reaches a working piston reversal point on the respective side.

5. Vibration generator according to claim 1, wherein the housing includes a fluid supply for supplying the pressure fluid.

6. Vibration generator according to claim 5, wherein the working piston further comprises a main supply line connecting the fluid supply with a supply control chamber, and two supply distributing lines alternately connecting the supply control chamber with the first and second pressure chambers.

7. Vibration generator according to claim 6, wherein the control piston includes control portions, through which the pressure fluid can be directed from the supply control chamber to either one supply distributing line or the other supply distributing line.

8. Vibration generator according to claim 1, wherein the control piston is supported centrally in the working piston.

9. Vibration generator according to claim 1, wherein the control piston is designed of a greater length than the working piston.

10. Construction apparatus, wherein at least one vibration generator according to any one of claims 1 to 9 is provided.

* * * * *

UNITED STATES PATENT AND TRADEMARK OFFICE

CERTIFICATE OF CORRECTION

PATENT NO. : 7,810,618 B2
APPLICATION NO. : 11/420041
DATED : October 12, 2010
INVENTOR(S) : Weber et al.

It is certified that error appears in the above-identified patent and that said Letters Patent is hereby corrected as shown below:

Title Pg, Item (30) Foreign Application Priority Data

May 30, 2005 (EP) ........................... Delete “05011642” and insert -- 05011642.5 --.

Signed and Sealed this
Eleventh Day of January, 2011

David J. Kappos
*Director of the United States Patent and Trademark Office*